(12) United States Patent
Choi

(10) Patent No.: US 12,311,893 B2
(45) Date of Patent: May 27, 2025

(54) DUST COLLECTOR FOR VEHICLE

(71) Applicant: Hoi Kyun Choi, Suwon-si (KR)

(72) Inventor: Hoi Kyun Choi, Suwon-si (KR)

( * ) Notice: Subject to any disclaimer, the term of this patent is extended or adjusted under 35 U.S.C. 154(b) by 0 days.

(21) Appl. No.: 18/838,112

(22) PCT Filed: Oct. 11, 2023

(86) PCT No.: PCT/KR2023/015595
§ 371 (c)(1),
(2) Date: Aug. 13, 2024

(87) PCT Pub. No.: WO2024/085524
PCT Pub. Date: Apr. 25, 2024

(65) Prior Publication Data
US 2025/0115216 A1    Apr. 10, 2025

(30) Foreign Application Priority Data
Oct. 21, 2022   (KR) .................. 10-2022-0136224

(51) Int. Cl.
*B60S 1/68* (2006.01)
*A47L 7/00* (2006.01)
(Continued)

(52) U.S. Cl.
CPC ............. *B60S 1/68* (2013.01); *A47L 7/0076* (2013.01); *A47L 9/0072* (2013.01);
(Continued)

(58) Field of Classification Search
CPC ........ B60S 1/68; A47L 7/0076; A47L 9/0072; A47L 9/1409; A47L 9/281; A47L 9/2842; A47L 9/2857; B01D 46/42
See application file for complete search history.

(56) References Cited

U.S. PATENT DOCUMENTS 5,162,053 A  * 11/1992 Kowalski, Jr. .......... B08B 17/00
                                                          55/467
7,833,302 B2 * 11/2010 Krantz ............... B01D 53/0407
                                                          55/385.3
(Continued)

FOREIGN PATENT DOCUMENTS

DE     102012009072 A1 * 11/2013 ............... B60S 1/68
JP        2008302803 A  * 12/2008
(Continued)

OTHER PUBLICATIONS

International Search Report for PCT/KR2023/015595 dated Jan. 4, 2024.
(Continued)

*Primary Examiner* — Marc Carlson
(74) *Attorney, Agent, or Firm* — Sughrue Mion, PLLC

(57) ABSTRACT

Provided is a dust collector for a vehicle, including wheel accommodation parts formed on both sides of a vehicle body and in which wheels are located, a plurality of suction parts provided on inner circumferential surfaces of the wheel accommodation parts and through which inlet holes of front surfaces of the suction parts pass in a front-rear direction to communicate with suction spaces, a collection part provided on the vehicle body in which accommodation space is formed to accommodate fine dust and an inlet port and an outlet port are formed to allow air to be introduced and discharged, a plurality of collection lines, a driving part connected to a rear end of each of the collection lines and the inlet port and generates a suction force, and a controller electrically connected to a battery provided in the vehicle body and controls operation of the driving part.

3 Claims, 10 Drawing Sheets

(51) Int. Cl.
  *A47L 9/00* (2006.01)
  *A47L 9/14* (2006.01)
  *A47L 9/28* (2006.01)

(52) U.S. Cl.
  CPC ............ *A47L 9/1409* (2013.01); *A47L 9/281* (2013.01); *A47L 9/2842* (2013.01); *A47L 9/2857* (2013.01)

(56) References Cited

U.S. PATENT DOCUMENTS

| | | | | |
|---|---|---|---|---|
| 11,828,340 | B2* | 11/2023 | Eichner | F16D 65/0031 |
| 11,940,025 | B2* | 3/2024 | Adamczak | F16D 65/0031 |
| 12,151,191 | B2* | 11/2024 | Eichner | B01D 46/0086 |
| 2002/0166311 | A1* | 11/2002 | Maricq | B03C 1/23 |
| | | | | 55/385.3 |
| 2006/0230729 | A1* | 10/2006 | Tabrizi | E01H 1/0836 |
| | | | | 55/385.3 |
| 2017/0248180 | A1* | 8/2017 | Metayer | F16D 55/22 |
| 2021/0362085 | A1* | 11/2021 | Eichner | B01D 46/69 |

FOREIGN PATENT DOCUMENTS

| | | | | |
|---|---|---|---|---|
| KR | 10-1998-0015663 | A | | 5/1998 |
| KR | 19980015663 | A | * | 5/1998 |
| KR | 101511663 | B1 | * | 4/2015 |
| KR | 10-2018-0085102 | A | | 7/2018 |
| KR | 20180085102 | A | * | 7/2018 |
| KR | 102096475 | B1 | * | 4/2020 |
| KR | 10-2020-0090370 | A | | 7/2020 |
| KR | 20200090370 | A | * | 7/2020 |
| KR | 102505361 | B1 | * | 2/2023 |
| WO | WO-2007056834 | A1 | * | 5/2007 ........... B60B 39/026 |

OTHER PUBLICATIONS

Written Opinion for PCT/KR2023/015595 dated Jan. 4, 2024.
Korean Office Action (Written Decision on Registration) for Korean Application No. 10-2022-0136224 dated Feb. 20, 2023, 5 Total pages.
Korean Office Action (Request for Submission of Opinion) for Korean Application No. 10-2022-0136224 dated Jan. 2, 2023, 11 Total pages.

* cited by examiner

DUST COLLECTOR FOR VEHICLE

CROSS REFERENCE TO RELATED APPLICATIONS

This application is a National Stage of International Application No. PCT/KR2023/015595 filed Oct. 11, 2023, claiming priority based on Korean Patent Application No. 10-2022-0136224 filed Oct. 21, 2022, the entire disclosures of which are incorporated herein by reference.

TECHNICAL FIELD

The present invention relates to a dust collector for a vehicle, and more specifically, to a dust collector for a vehicle that is capable of collecting fine dust generated by a wheel accommodation part while a vehicle travels to minimize environmental pollution.

BACKGROUND ART

Air pollution is becoming serious day by day due to industrial development and urbanization, and air pollution is becoming more serious due to various types of fine dust generated while vehicles (electric vehicles and the like) travel.

Tire dust generated due to friction between tires and roads while vehicles travel, metal dust generated by brake discs and pads when vehicles brake, and the like act as factors that further increase the amount of generated fine dust.

However, since a fine dust treatment technology is not applied to the conventional vehicle, more serious air pollution is expected, and in the case of electric vehicles of which sales amounts have recently been rapidly increasing, since a large amount of fine dust is generated by tires and braking systems, there is a need for technology that can effectively collect and treat the fine dust generated by the tires and braking systems.

Korean Registered Patent Publication No. 10-2096475 (Mar. 27, 2020) is the related art of the present invention and discloses "Apparatus for removing dust."

DISCLOSURE

Technical Problem

The purpose of the present invention is directed to providing a dust collector for a vehicle that is capable of collecting fine dust generated by a wheel accommodation part while a vehicle travels to minimize environmental pollution.

Technical Solution

A dust collector for a vehicle according to the present invention provides including wheel accommodation parts which are formed on both sides of a vehicle body and in which wheels are located, a plurality of suction parts which are provided on inner circumferential surfaces of the wheel accommodation parts and through which inlet holes of front surfaces of the suction parts pass in a front-rear direction to communicate with suction spaces, a collection part which is provided on the vehicle body in which accommodation space is formed to accommodate fine dust and an inlet port and an outlet port are formed to allow air to be introduced and discharged, a plurality of collection lines which have lengths in the front-rear direction and have front ends connected to the suction parts and of which passages passing through the collection lines in a longitudinal direction communicate with the suction spaces, a driving part which is connected to a rear end of each of the collection lines and the inlet port and generates a suction force when driven to forcibly move air transmitted through each of the passages to the inlet port, and a controller which is electrically connected to a battery provided in the vehicle body and controls operation of the driving part, wherein the collection part discharges the air, which is introduced through the inlet port, through the outlet port, and the fine dust included in the air is collected into the accommodation space.

In addition, the suction part may be located to be spaced apart from the wheel in a radial direction of the wheel and may have a curved length in a rotational direction of the wheel, and the plurality of inlet holes may be arranged to be spaced apart from each other in one or more directions of a longitudinal direction and a width direction of the suction part.

In addition, the dust collector for a vehicle may further include a filter part coupled to the outlet port to filter the air.

In addition, the dust collector for a vehicle may further include a collecting amount sensor which is coupled to the collection part and transmits an alarm signal to the controller when an amount of the fine dust collected into the accommodation space is a predetermined amount or more and a signal output part which is electrically connected to the controller in a state of being installed on the vehicle body and is turned on to emit light to an outside when the alarm signal is transmitted to the controller.

In addition, the dust collector for a vehicle may further include a speed sensor which is electrically connected to the controller and detects a movement speed of the vehicle body, wherein the controller may preset a reference speed and change a suction force of the driving part such that the suction force is proportional to the movement speed transmitted from the speed sensor.

In addition, the dust collector for a vehicle may further include a vibration generator which transmits vibrations to the suction part, wherein the vibration generator may include a vibration motor which is coupled to one side of the suction part and of which driving is controlled by the controller and a heavy weight which is eccentrically rotatably coupled to a driving shaft of the vibration motor and generates vibrations due to eccentric rotation when the driving shaft rotates.

Advantageous Effects

The present invention has effects that, since various types of fine dust generated by a wheel accommodation part while a vehicle travels can be collected, environmental pollution can be minimized, since the fine dust can be collected using a suction force proportional to a travel speed of the vehicle, uniform collecting performance can be maintained, and since a fine dust collection line can be easily separated from the vehicle, maintenance is easy.

BEST MODES OF THE INVENTION

Hereinafter, exemplary embodiments according to the present invention will be described in detail with reference to the accompanying drawings.

Advantages and features of the present disclosure and methods of achieving the same will become apparent with reference to the accompanying drawings and the following detailed embodiments.

However, the present disclosure is not limited to the embodiments to be disclosed below but may be implemented in various different forms, the embodiments are provided so that the present disclosure is completely implemented and provided to fully explain the scope of the present disclosure for those skilled in the art, and the scope of the present disclosure is defined by the appended claims.

In addition, in the description of the invention, when it is determined that detailed descriptions of related well-known technologies unnecessarily obscure the gist of the invention, the detailed descriptions thereof will be omitted.

Figure 1:
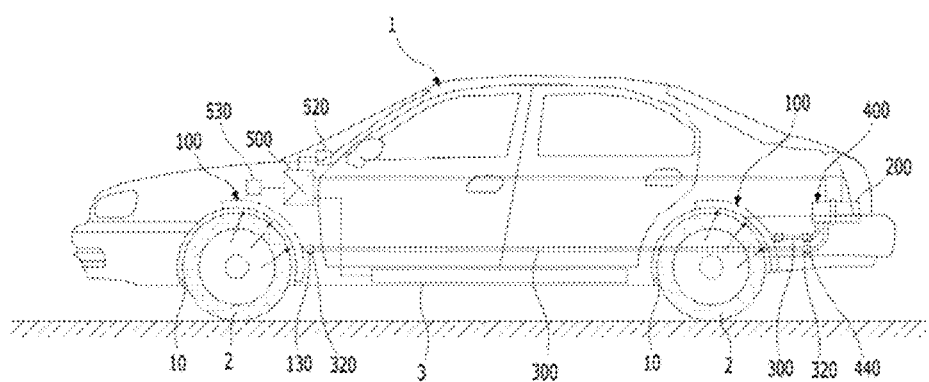
FIG. 1 is a side view showing a state in which a dust collector for a vehicle is installed in a vehicle according to the present invention.
Figure 2:
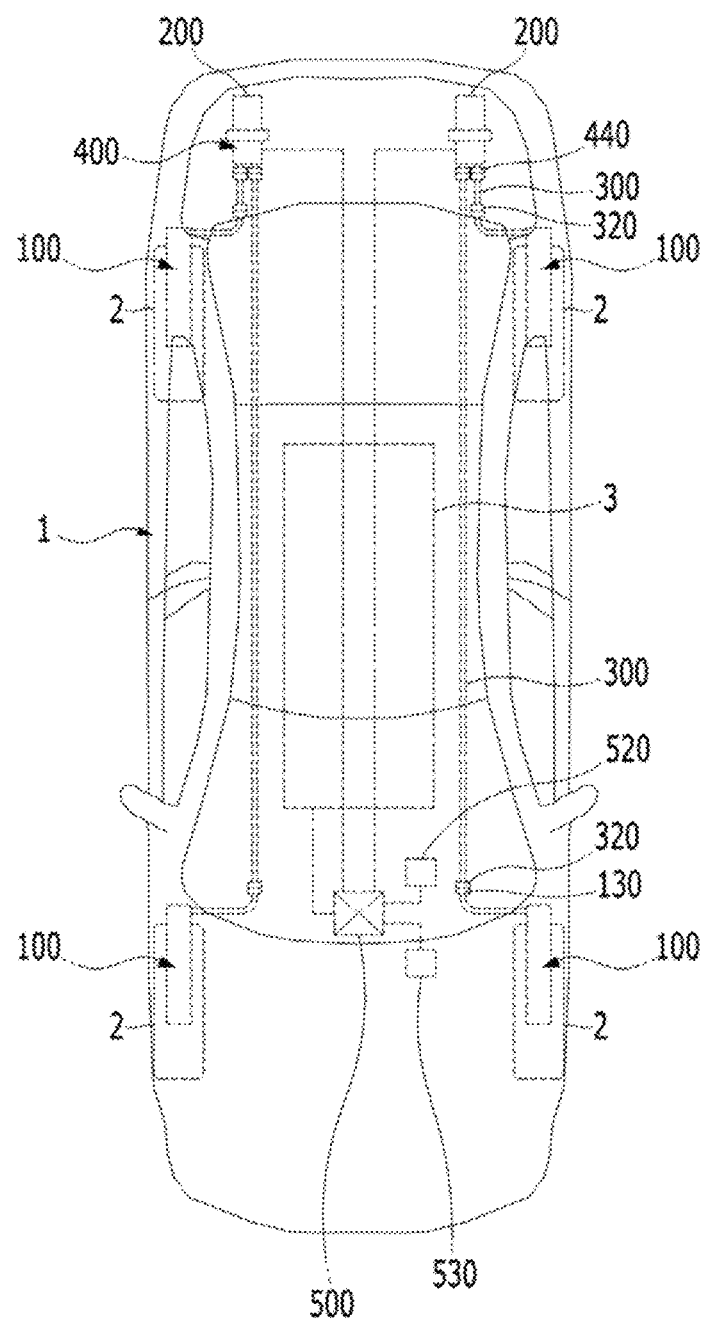
FIG. 2 is a plan view showing the state in which the dust collector for a vehicle is installed in the vehicle according to the present invention.
Figure 3:
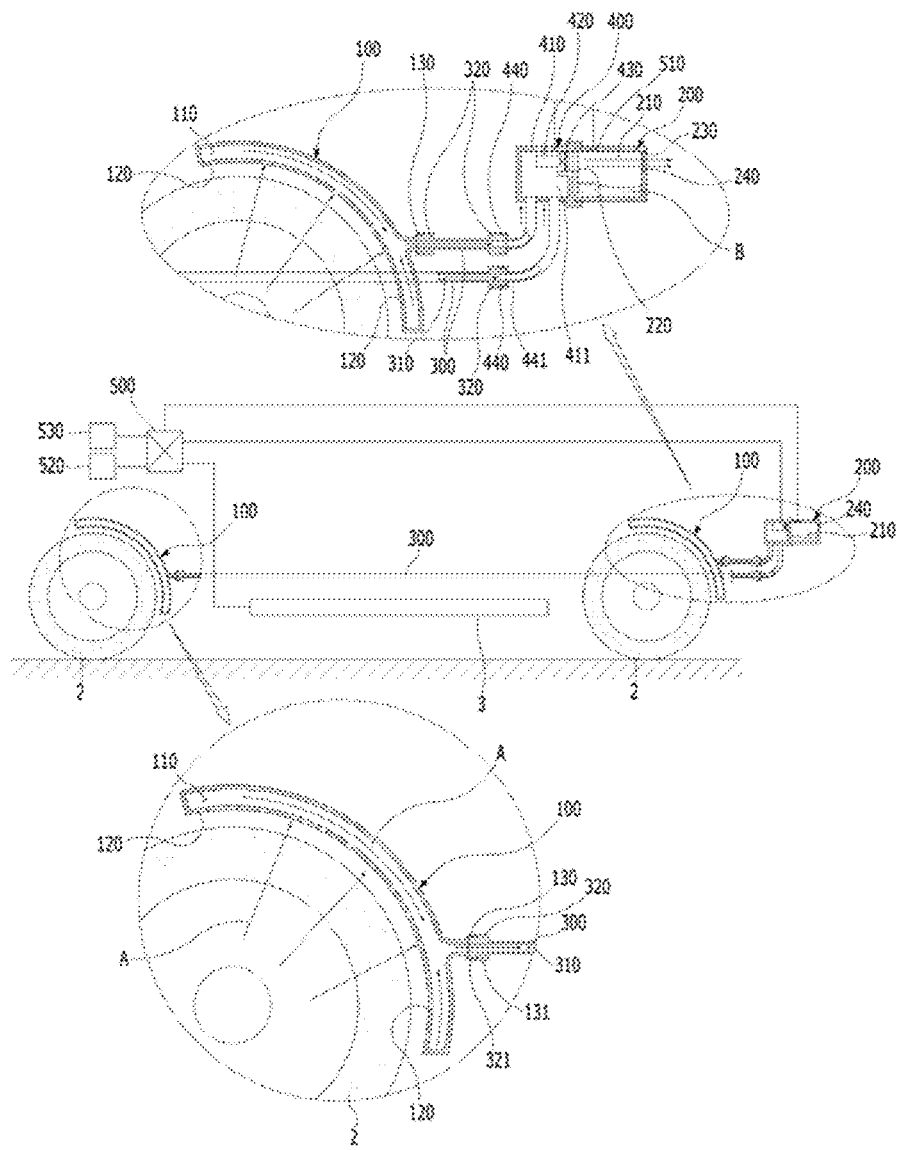
FIG. 3 is a detailed side view showing the dust collector for a vehicle according to the present invention.
Figure 4:
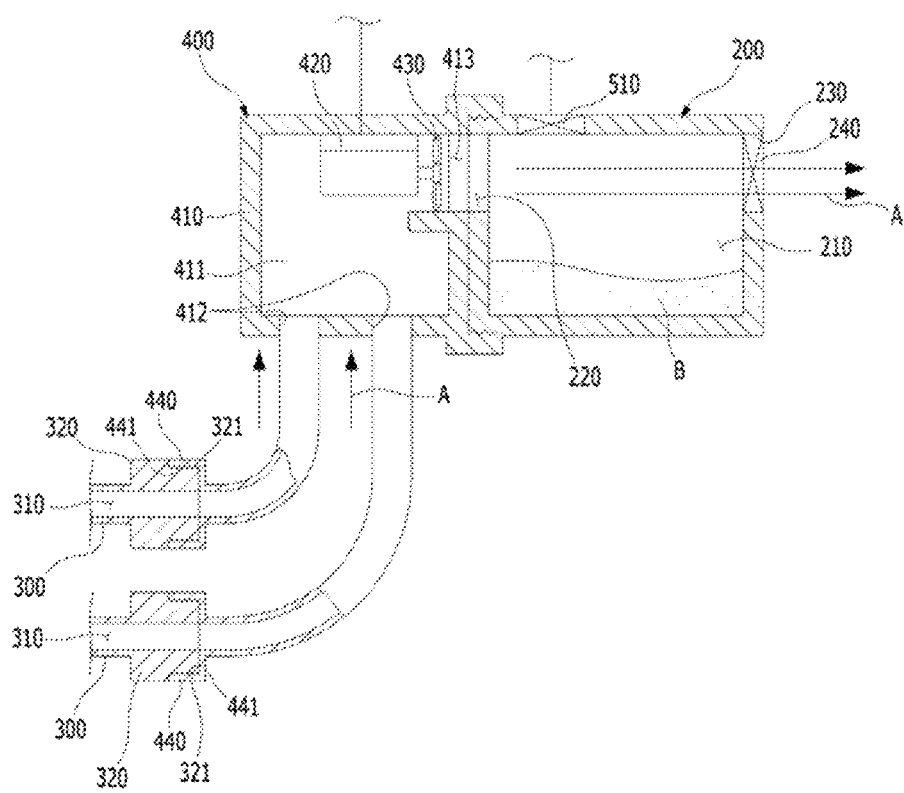
FIG. 4 is a side cross-sectional view showing a collection part and a driving part of the dust collector for a vehicle according to the present invention.
Figure 5:
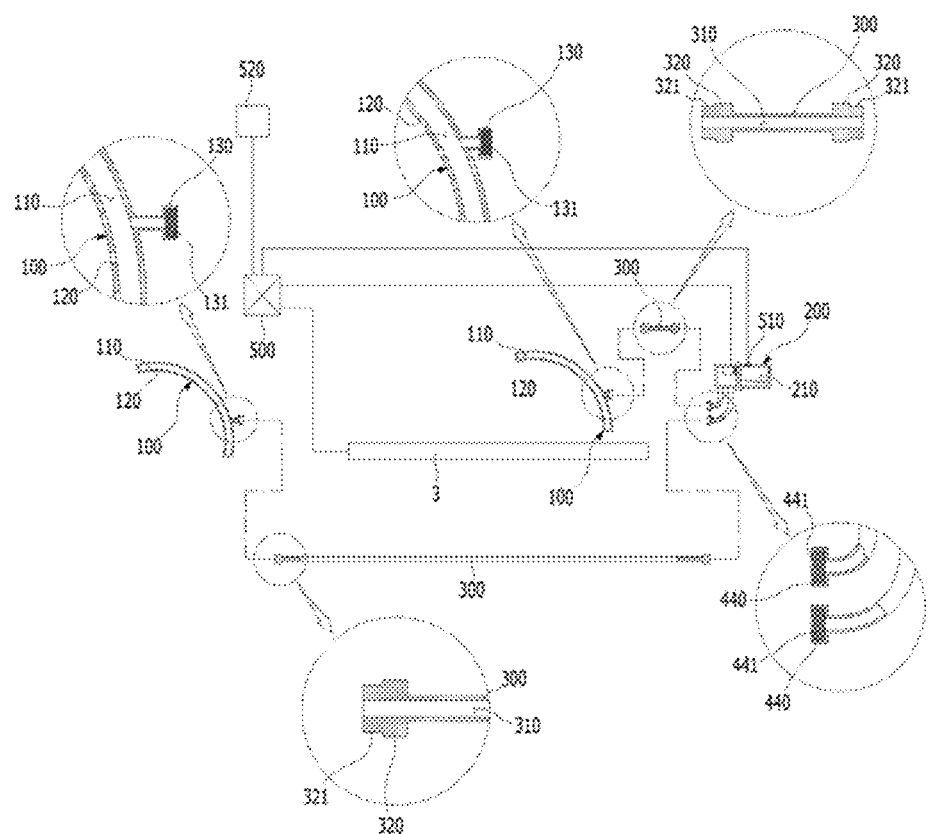
FIG. 5 is a detailed side view showing a state in which components of the dust collector for a vehicle are separated according to the present invention.
Figure 6:
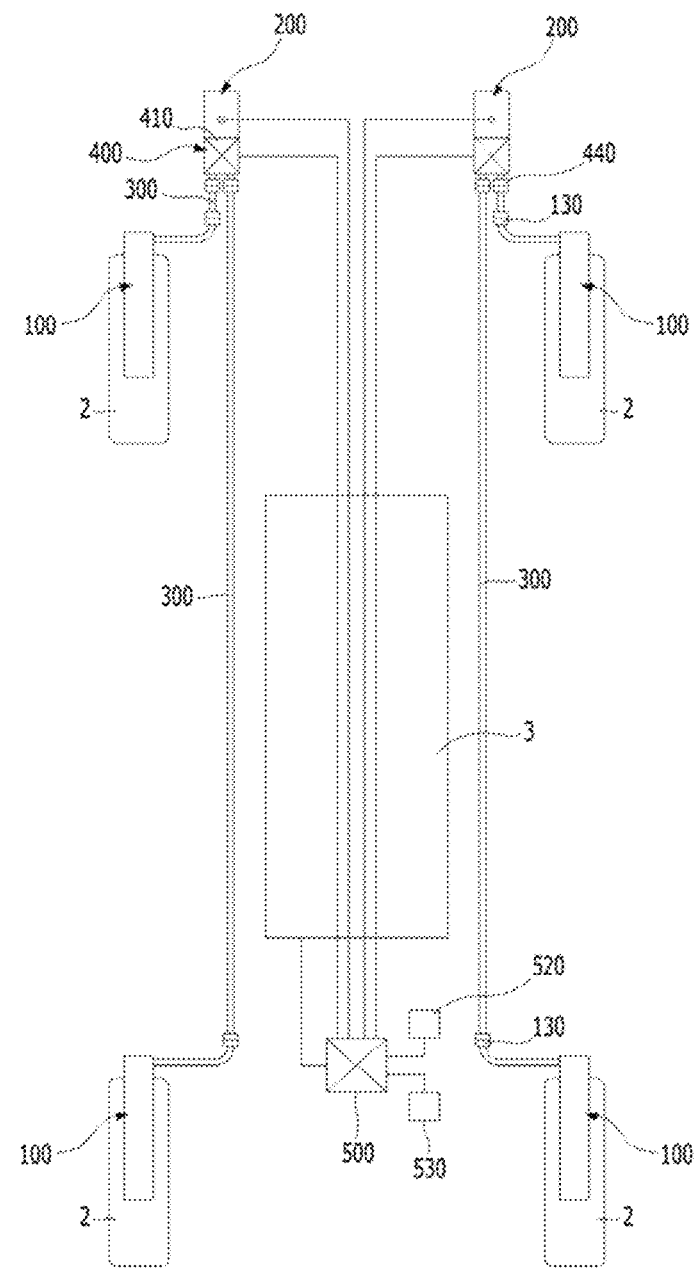
FIG. 6 is a plan view showing the dust collector for a vehicle according to the present invention.

FIG. 1 is a side view showing a state in which a dust collector for a vehicle is installed in a vehicle according to the present invention, and FIG. 2 is a plan view showing the state in which the dust collector for a vehicle is installed in the vehicle according to the present invention. FIG. 3 is a detailed side view showing the dust collector for a vehicle according to the present invention, and FIG. 4 is a side cross-sectional view showing a collection part and a driving part of the dust collector for a vehicle according to the present invention. FIG. 5 is a detailed side view showing a state in which components of the dust collector for a vehicle are separated according to the present invention, and FIG. 6 is a plan view showing the dust collector for a vehicle according to the present invention.

Figure 7:
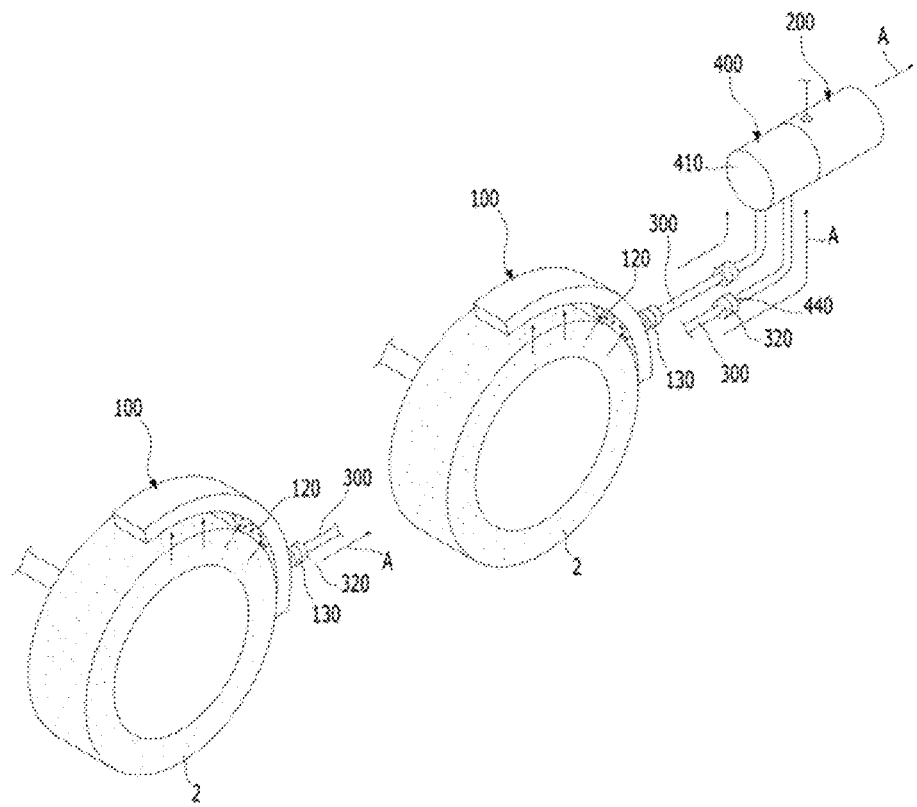
FIG. 7 is a perspective view showing a state in which suction parts of the dust collector for a vehicle are installed on a front wheel and a rear wheel according to the present invention.
Figure 8:
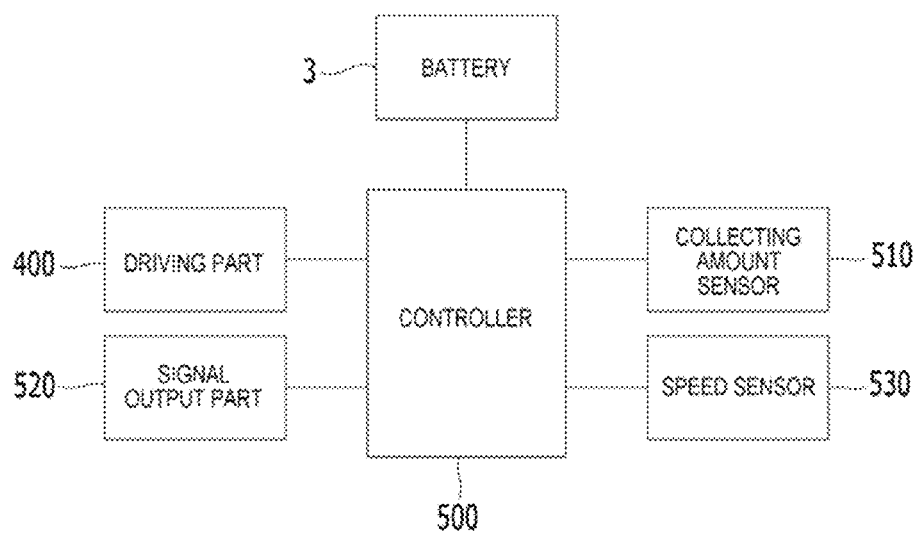
FIG. 8 is a schematic block diagram showing connection relationships between a controller, a battery, the driving part, a signal output part, a collecting sensor, and a speed sensor of the dust collector for a vehicle according to the present invention.
Figure 9:
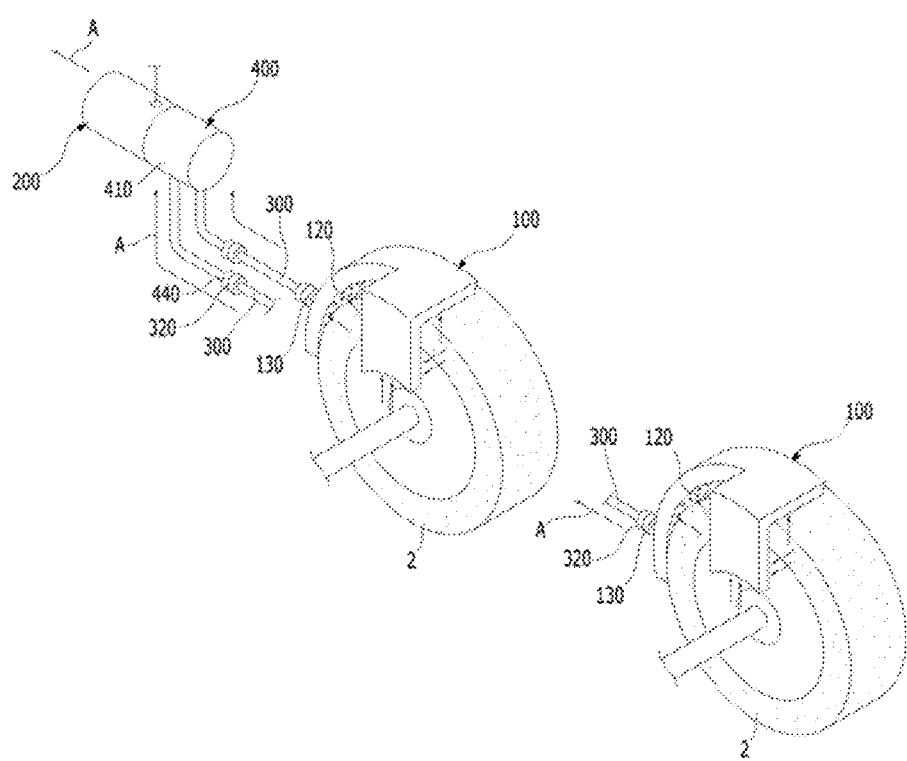
FIG. 9 is a perspective view showing a state in which auxiliary suction parts of the dust collector for a vehicle are applied to the front wheel and the rear wheel according to the present invention.
Figure 10:
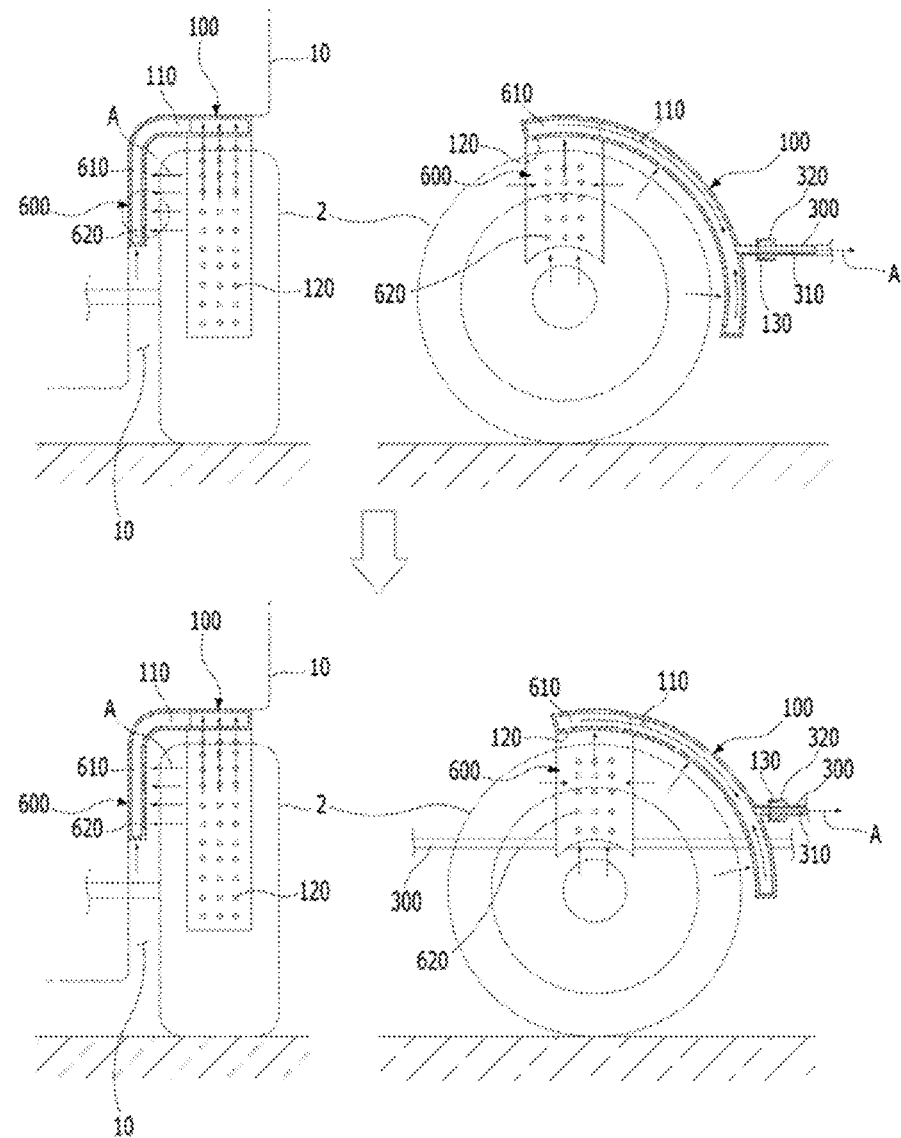
FIG. 10 is a view showing the state in which the auxiliary suction parts of the dust collector for a vehicle are applied to the front wheel and the rear wheel according to the present invention.
Figure 11:
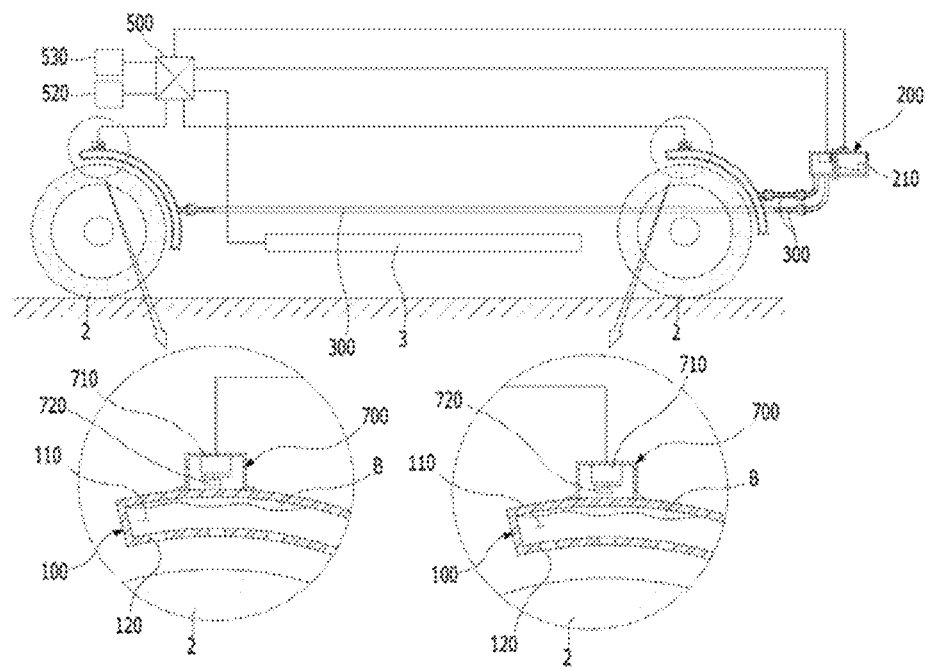
FIG. 11 is a side cross-sectional view showing a state in which vibration generators are applied to the suction parts of the dust collector for a vehicle according to the present invention.

FIG. 7 is a perspective view showing a state in which suction parts of the dust collector for a vehicle are installed on a front wheel and a rear wheel according to the present invention, and FIG. 8 is a schematic block diagram showing connection relationships between a controller, a battery, the driving part, a signal output part, a collecting sensor, and a speed sensor of the dust collector for a vehicle according to the present invention. FIG. 9 is a perspective view showing a state in which auxiliary suction parts of the dust collector for a vehicle are applied to the front wheel and the rear wheel according to the present invention, and FIG. 10 is a view showing the state in which the auxiliary suction parts of the dust collector for a vehicle are applied to the front wheel and the rear wheel according to the present invention. FIG. 11 is a side cross-sectional view showing a state in which vibration generators are applied to the suction parts of the dust collector for a vehicle according to the present invention.

Referring to FIGS. 1 to 11, a dust collector for a vehicle according to the present invention is provided in one of various vehicles (buses, trucks, sedans, and the like) which use electric motors or internal combustion engines as main power sources and includes wheel accommodation parts 10, a plurality of suction parts 100, collection parts 200, a plurality of collection lines 300, driving parts 400, and a controller 500.

The wheel accommodation parts 10 are formed to be recessed from both sides of a vehicle body 1 such that wheels 2 of a vehicle are located inside the wheel accommodation parts 10 and are divided into a pair of front wheel accommodation parts located at a front side of the vehicle body 1 and a pair of rear wheel accommodation parts located at a rear side of the vehicle body 1. In this case, front wheels 2 are rotatably located in the front wheel accommodation parts 10, and rear wheels 2 are rotatably located in the rear wheel accommodation parts 10.

The suction parts 100 are for suctioning fine dust B generated in the wheel accommodation parts 10 and are provided on inner circumferential surfaces of the wheel accommodation parts 10. Inlet holes 120 in front surfaces of the suction parts 100 may pass through the suction parts 100 in a front-rear direction to communicate with suction spaces 110 in the suction parts 100, and outlet holes may pass through rear surfaces of the suction parts 100 in the front-rear direction so that the fine dust B moved along the suction spaces 110 is discharged.

In this case, the suction part 100 may be eccentrically disposed on the rear side of the vehicle body 1 with respect to a horizontal rotation center of the wheel 1, but a location of the suction part 100 may be variously applied, and the suction part 100 may have a curved length in a rotational direction of the wheel 2.

In addition, the front surface of the suction part 100 may be collinearly disposed with an axial center of the wheel 1, but the location of the suction part 100 may be variously applied as necessary. In this case, the front surface of the suction part 100 may be formed to be curved in the front-rear direction and recessed rearward.

In addition, the suction part 100 may be inserted into and located at the inner circumferential surface of the wheel accommodation part 10, and the front surface of the suction part 100 may be coplanar with the inner circumferential surface of the wheel accommodation part 10. In this case, since the front surface of the suction part 100 does not protrude inward from the wheel accommodation part 10, frictional resistance with air A can be reduced while the vehicle travels.

The suction space 110 is for moving the fine dust B suctioned through the inlet hole 120 to the collection line 300, which will be described below and has a length in the front-rear direction of the suction part 100, and the fine dust B moved in a longitudinal direction of the suction space 110 is moved to the collection line 300, which will be described below, through the outlet hole at a rear side of the suction space 110.

The inlet hole 120 is for causing the fine dust B to flow into the suction space 110, and a plurality of inlet holes 120 may be arranged to be spaced apart from each other in one or more directions of a longitudinal direction and a width direction of the suction part 100 and have predetermined diameters to allow the fine dust B to flow.

That is, when a suction pressure of the driving part 400, which will be described below, acts, the fine dust B introduced through the inlet hole 120 may move along the suction space 110 and forcibly move to the collection part 200 through the collection line 300 and the driving part 400 which will be described below.

In addition, a first coupling member 130 may protrude from the rear surface of the suction part 100 to be coupled to a front end of the collection line 300 which will be described below. The outlet hole may pass through the first coupling member 130 to discharge the air A, the first coupling member 130 may have a cylindrical shape having a circumference based on a direction in which the outlet hole passes through the first coupling member 130, and a first screw thread 131 may be formed on an inner circumferential surface or outer circumferential surface of the first coupling member 130 to be engaged with the front end of the collection line 300 in a screw coupling manner.

The suction part 100 may be installed on each of the pair of front wheel accommodation parts 10 located at the front side of the vehicle body 1 and the pair of rear wheel accommodation parts 10 located at the rear side of the vehicle body 1, and when a suction force of the driving part 400, which will be described below, acts, the fine dust B may be suctioned in each of four wheel accommodation parts 10. That is, the fine dust B may be suctioned at locations adjacent to the pair of front wheels 2 and the pair of rear wheels 2.

The collection part 200 is for accommodating the fine dust B which passes through the suction part 100, the collection line 300, and the driving part 400 and may be installed in the vehicle body 1, an accommodation space 210 may be installed in the collection part 200 to accommodate the fine dust B, and an inlet port 220 and an outlet port 230 may be disposed in the collection part 200 to allow the air A to be introduced and discharged.

In this case, the collection part 200 may be fixedly installed in a trunk formed at the rear side of the vehicle body 1 and exposed to an internal space of the trunk to be visually checked and replaced by a user, and the collection part 200 may be located in an opening and closing storage structure (not shown).

In addition, when the collection part 200 is installed in the vehicle body 1 or the trunk, the outlet port 230 may communicate with the outside of the vehicle body 1 through a separate discharge pipe (not shown). In this case, an entrance side of the discharge pipe may be connected to the outlet port 230, and an exit side of the discharge pipe may be exposed under the vehicle body 1 or the like to discharge air to the outside.

In addition, the collection parts 200 may include a first collection part connected to right wheel accommodation parts 10 of the vehicle body 1 and a second collection part connected to left wheel accommodation parts 10 of the vehicle body 1. In this case, the first collection part and the second collection part may be installed at both sides of the trunk and may collect the fine dust B suctioned through the left wheel accommodation parts and the right wheel accommodation parts.

In addition, the collection part 200 may be manufactured of a transparent material (plastic or the like) to check whether there is the fine dust B and an amount thereof, and a corresponding coupling structure (not shown) may be applied to a front end of the collection part 200 to enable coupling and separation with the driving part 400 which will be described below.

The inlet port 220 is for allowing the air A and fine dust B included in the air A to be introduced and may be formed in a front surface of the collection part 200, and when a front end of the inlet port 220 is coupled to the driving part 400 which will be described below, the inlet port 220 of the collection part 200 and the outlet port 230 of a housing 410 which will be described below may communicate with each other in the front-rear direction.

The outlet port 230 is for discharging the air A introduced into the accommodation space 210 to the outside and may be formed in a rear surface of the collection part 200, a location of the outlet port 230 may be variously applied as necessary, and a filter part 240 for filtering the air A may be further installed in the outlet port 230.

One of various filters through which the air A passes and the fine dust B does not pass may be used as the filter part 240, the filter part 240 may be coupled such that an edge of the filter part 240 is in close contact with an inner circumferential surface of the outlet port 230, and the inner circumferential surface of the outlet port 230 and the edge of the filter part 240 may have corresponding assembly structures such that the filter part 240 is replaceable after being used for a predetermined time period.

For example, when the driving part 400 which will be described below is driven, the air A introduced through the inlet port 220 may be discharged to the outside through the accommodation space 210 and the outlet port 230, the fine dust B introduced with the air A may not pass through the outlet port 230 and may be collected into the accommodation space 210, and the user may visually check an amount of the fine dust B collected into the collection part 200.

In addition, when a signal output part 520 which will be described below is turned on, the user may immediately visually recognize a time at which the collection part 200 should be emptied, check a state of the filter part 240 while emptying the collection part 200, and periodically check the state for each set period of use to determine whether the filter part 240 should be replaced.

The plurality of collection lines 300 are for moving the air A suctioned by the suction parts 100 to the collection parts 200, may each have a pipe shape having a length in the front-rear direction, the front end of the collection line 300 may be connected to one side of the suction part 100, and a passage 310 passing through the inside of the collection line 300 in a longitudinal direction communicate with the suction space 110.

In this case, the collection lines 300 may include two right collection lines 300, which connect right suction parts 100 located on the right wheel accommodation parts 10 of the vehicle body 1 and the first collection part, and two left collection lines 300, which connect left suction parts 100 located on the left wheel accommodation parts 10 of the vehicle body 1 and the second collection part.

In addition, second coupling members 320 for screw-coupling with the first coupling member 130 and a third coupling member 440 which will be described below in a screw coupling manner may be provided on the front end and a rear end of the collection line 300. The passage 310 may pass through each of the second coupling members 320 in the front-rear direction to allow the air A to move, the second coupling members 320 may have cylindrical shapes having circumferences with respect to a direction in which the passage 310 passes through each of the second coupling members 320, and second screw threads 321 may be formed on outer circumferential surfaces or inner circumferential surfaces of the second coupling members 320.

In the collection line 300, the second coupling members 320 may be coupled to the first coupling member 130 and the third coupling member 440 in a screw coupling manner by positioning the front second coupling member 320 to correspond to the first coupling member 130 of the suction part 100 in the front-rear direction, positioning the rear second coupling member 320 to correspond to the third coupling member 440, which will be described below, in the front-rear direction, and rotating the collection line 300 forward in a coupling direction.

Meanwhile, the second coupling members 320 may be separated from the first coupling member 130 and the third coupling member 440 by rotating the collection lines 300 forward in a coupling release direction. That is, since the collection line 300 may be easily coupled and separated, cleaning is easy, and since a coupling or separating process of the collection line 300 is simple, maintenance is easy.

The driving part 400 is for generating a suction pressure, may be connected to the rear end of the collection line 300 and the inlet port 100 of the collection part 200 and generate a suction force when driven to forcibly move the air A transmitted through the passage to the inlet port, and the driving of the driving part 400 may be controlled by the controller 500 which will be described below.

In this case, the driving part 400 may include the housing 410 in which an introduction space 411 is formed and of which a rear end is coupled to the front end of the collection part 200, a plurality of first communication holes 412 perpendicularly passing through a lower end of the housing 410 and connected to rear ends of the collection lines 300, a second communication hole 413 passing through the rear end of the housing 410 in the front-rear direction and communicating with the inlet port 220 of the collection part 200 in the front-rear direction, a rotary motor 420 which is fixedly installed in the introduction space 411 and of which the driving is controlled by the controller 500 which will be described below, and a blast fan 430 which is rotatably coupled to a driving shaft of the rotary motor 420 and moves the air A in the introduction space 411 to the inside of the accommodation space 210 through the second communication hole 413 and the inlet port 220 when rotated.

The housing 410 may be fixedly installed in the vehicle body 1 or in the trunk of the vehicle body 1, a corresponding coupling structure (not shown) that enables coupling and separation with the front end of the collection part 200 may be applied to the rear end of the housing 410. For example, the rear end of the housing 410 and the front end of the collection part 200 may be coupled or separated in a screw coupling manner, and when a predetermined portion (95% or the like) of the accommodation space 210 of the collection part 200 is filled with the fine dust, the collection part 200 may be separated from the housing 410 to discharge the fine dust B to the outside, or to be washed.

As in FIGS. 3 and 4, the rotary motor 420 may be fixedly installed in the introduction space 411, the driving shaft protruding rearward from the rotary motor 420 may be horizontally located in a direction in which the second communication hole 413 passes through the rear end of the housing 410, and the rotary motor 420 may be electrically connected to the controller 500 which will be described below and driven by power of a battery 3 of the vehicle. In the case of being applied to an electric vehicle, the high-capacity battery 3 disposed in the vehicle body 1 may be used for supplying power as driving power of the rotary motor 420.

The blast fan 430 may be located at an introduction side of the second communication hole 413 and coupled to the driving shaft of the rotary motor 420 such that a horizontal rotation center of the blast fan 430 is coaxial with the driving shaft of the rotary motor 420, and a plurality of rotary wings may be radially arranged about the horizontal rotation center of the blast fan 430. The blast fan 430 may rotate with the driving shaft of the rotary motor 420 to forcibly move the air A in the introduction space 411 to the inside of the accommodation space 210 through the second communication hole 413 and the inlet port 220.

In addition, a plurality of third coupling members 440 for coupling with the second coupling members 320 of the collection lines 300 in a screw coupling manner may be provided on a lower end of the housing 410, and the first communication holes 412 may pass through the third coupling members 440 in the front-rear direction such that the air A moves. In this case, the third coupling member 440 may have a cylindrical shape having a circumference based on a direction in which the first communication hole 412 passes through the third coupling members 440, and a third screw thread 441 may be formed on an outer circumferential surface or inner circumferential surface of the third coupling member 440.

In addition, a rear end of the third coupling member 440 and the first communication hole 412 may be connected by a connection pipe, both sides of the connection pipe in a longitudinal direction may be connected to the rear end of the third coupling member 440 and the first communication hole 412, and a passage may pass through the inside of the connection pipe in the longitudinal direction such that the air A moves.

For example, the second coupling member 320 and the third coupling member 440 may be coupled in a screw coupling manner by positioning the second coupling member 320 of the collection line 300 to correspond to a front end of the third coupling member 440 and rotating the collection line 300 forward in the coupling direction, and since the passage 310 inside the second coupling member 320 and the first communication hole 412 inside the third coupling member 440 communicate with each other, the fine dust B moved to the rear side of the collection line 300 may move to the accommodation space 210 through the introduction space 411.

The controller 500 is for controlling the driving of the driving part 400, the controller 500 may switch from a state of the driving part 400 to a state in which the driving part 400 is turned on in a state in which the vehicle is started, switch from a state of the driving part 400 to a state in which the driving part 400 is turned off in a state in which the vehicle is stopped, and switch from a state of the driving part 400 to a state in which the driving part 400 is turned on or off through a manual operation of the user.

In addition, an operation part (not shown) may be electrically connected to the controller 500 such that the user may manually turn the driving part 400 on or off. The operation part may be provided at an interior side (on a dashboard, door, or the like) of the vehicle and include an operation switch for selecting various functions and an information display part (not shown) for displaying an operation state of the driving part 400 toward the outside.

For example, when the driving shaft of the rotary motor 420 is rotated by driving control of the controller 500, the blast fan 430 rotates to generate a suction pressure, and the air A introduced through the inlet hole 120 of the suction part 100 is introduced into the introduction space 411 of the housing 410 through the suction space 110 and the collection line 300.

The air A introduced into the introduction space 411 is moved to the accommodation space 210 of the collection part 200 and discharged to the outside of the housing 410 through the outlet port 230, and the fine dust B suctioned with the air A is collected into the accommodation space 210. In this case, since the filter part 240 installed in the outlet port 230 discharges only the air A to the outside, the fine dust B collected into the accommodation space 210 is not discharged to the outside of the housing 410.

The dust collector for a vehicle according to one embodiment of the present invention may further include a collecting amount sensor 510, which is coupled to the collection part 200 and transmits an alarm signal to the controller 500 when the accommodation space 210 is filled with a predetermined amount or more of the fine dust B collected into the accommodation space 210, and the signal output part 520 which is electrically connected to the controller 500 when installed on the vehicle body 1 and turned on to emit light to the outside when the alarm signal is transmitted to the controller 500.

The collecting amount sensor 510 may be electrically connected to the controller 500 while fixedly coupled to the collection part 200, and a detection side at one side may detect an amount of collected fine dust B in the accommodation space 210, and may detect the amount of the collected fine dust B using a height of the fine dust B collected into the accommodation space 210, a pressure of the accommodation space 210, etc.

In this case, one of various sensors capable of measuring an amount of collected fine dust B may be selectively used as the collecting amount sensor 510, a differential pressure sensor, a pressure sensor, an infrared ray sensor, or the like may be used, or any of various sensors may be selectively used as necessary.

For example, when the differential pressure sensor or the pressure sensor is applied as the collecting amount sensor 510, a change in pressure in the accommodation space 210 may be detected, and when the accommodation space 210 is fully filled with the fine dust B, since the outlet port 230 of the collection part 200 is blocked, an increase in pressure of the accommodation space 210 may be detected, and the controller 500 may turn the signal output part 520 on to emit light to the outside.

Meanwhile, when the infrared ray sensor is applied to the collecting amount sensor 510, a height of the fine dust B accumulated on a bottom surface of the accommodation space 210 may be detected, and when the fine dust B reaches a predetermined height, the collecting amount sensor 510 may detect the fine dust B and transmit a detection signal to the controller 500, and the controller 500 may turn the signal output part 520 on to emit light to the outside.

The signal output part 520 may be provided at the interior side (on the dashboard, door, or the like) of the vehicle and turned on to emit red light, green light, or the like toward the interior side of the vehicle when an alarm signal is transmitted to the controller 500. That is, a passenger of the vehicle may easily visually check the light (red light or the like) emitted from the signal output part 520, and immediately recognize a time point at which the collection part 200 should be emptied.

In addition, a speed sensor 530 which is electrically connected to the controller 500 and detects a movement speed of the vehicle body 1 may be further included, a reference speed may be preset in the controller 500, and the controller 500 may change a suction force of the driving part 400 such that the suction force is proportional to the movement speed transmitted from the speed sensor 530.

A speed sensor may be used as the speed sensor 530, and a movement speed of the vehicle may be detected using a speed measurement device installed on the vehicle. For example, when the vehicle travels at a speed of 10 km/hour, the driving shaft of the rotary motor 420 may be rotated at a speed in a first stage, and when the vehicle travels at a speed of 20 km/hour, the driving shaft of the rotary motor 420 may be rotated at a speed in a second stage to increase a suction pressure.

That is, since an amount of generated fine dust B increases due to friction between a brake pad and the wheel 2 as a movement speed of the vehicle increases, a large amount of the fine dust B may be suctioned using a high pressure by increasing a rotational speed of the rotary motor 420, and since an amount of generated fine dust B decreases as a movement speed of the vehicle decreases, an amount of used electrical energy and noise can be reduced by reducing a rotational speed of the rotary motor 420.

As in FIGS. 9 and 10, the dust collector for a vehicle according to one embodiment of the present invention may further include an auxiliary suction part 600. The auxiliary suction part 600 may horizontally extend from one side of the suction part 100 in the width direction and extend to be bent downward, and a lower end of the auxiliary suction part 600 between the vehicle body 1 and the suction part 100 may be located close to the horizontal rotation center of the wheel 2. As necessary, the auxiliary suction part 600 may be vertically located at one side of the wheel 2 opposite to the vehicle body 1 in an axial direction to be exposed to the outside of the vehicle body 10, and the auxiliary suction part 600 may be disposed both between the vehicle body 1 and the suction part 100 and at one side of the wheel 2 opposite to the vehicle body 1 in an axial direction.

In this case, an auxiliary suction space 610 may be formed in the auxiliary suction part 600, an upper side of the auxiliary suction space 610 may communicate with one side of the suction space 110 in a width direction so that the air A may flow, and an auxiliary inlet hole 620 is formed in one side surface of the auxiliary suction part 600 such that the air A is suctioned into the auxiliary suction space 610.

The auxiliary inlet hole 620 may be formed in one side surface of the auxiliary suction part 600 facing the wheel 2 and may pass through the auxiliary suction part 600 in a left-right direction such that the fine dust B generated in the wheel accommodation part 10 moves to the auxiliary suction space 610. In this case, a plurality of auxiliary inlet holes 620 may be arranged to be spaced apart from each other in one direction of a vertical direction and the front-rear direction of the auxiliary suction part 600 and may have predetermined diameters such that the fine dust B is introduced therethrough.

For example, when a suction pressure of the driving part 400 acts, the fine dust B suctioned through the auxiliary inlet holes 620 may move to the suction space 110 through the auxiliary suction space 610, and the fine dust B moved to the suction space 110 may be forcibly moved to the collection part 200 through the collection line 300 and the driving part 400.

That is, since the air A is introduced through the inlet hole 120 located in a radial direction of the wheel 2 and the auxiliary inlet holes 620 located in the axial direction of the wheel 2, an amount of suctioned fine dust B may be increased, and since the auxiliary suction part 600 may suction the fine dust B at a location close to the rotation center of the wheel 2 (a brake pad installation location or the like), collection performance can be improved.

As in FIG. 11, the dust collector for a vehicle according to one embodiment of the present invention may further include a vibration generator 700 for transmitting vibration to the suction part 100. The vibration generator 700 may include a vibration motor 710 which is coupled to one side of the suction part 100 and of which driving is controlled by the controller 500 and a heavy weight 720 which is eccentrically rotatably coupled to a driving shaft of the vibration motor 710 and generates vibration due to eccentric rotation.

In addition, a separate case may be coupled to one side of the suction part 100, the vibration motor 710 may be fixedly installed in the case, and a driving time of the vibration motor 710 may be preset in the controller 500 to periodically operate the vibration motor 710, or the vibration motor 710 may be manually driven using the operation part of the controller 500.

One side of the heavy weight 720 may be eccentrically rotatably coupled to a front end of the driving shaft, the heavy weight 720 may be formed of a material such as a metal for generating vibration, a speed at which the driving shaft of the vibration motor 710 is rotated may be variously set to variously adjust a vibration generating strength, and since the vibration motor 710 is fixed to the suction part 100, when the heavy weight 720 is rotated, the vibration may be transmitted to the suction part 100. When the driving shaft is rotated, since the one eccentric side of the heavy weight 720 is rotated with a larger radius of rotation due to a centrifugal force, the vibration can be transmitted to the driving shaft of the vibration motor 710.

That is, since the fine dust B that sticks to an inner circumferential surface of the suction space 110 may be separated using the vibration generated when the heavy weight 720 eccentrically rotates, a block phenomenon of the suction space 110 can be prevented, and since a decrease in cross-sectional area of the suction space 110 due to the sticking of the fine dust B does not occur, optimal operation performance of the apparatus can be maintained.

As a result, according to the present invention, since various types of fine dust B generated by the wheel accommodation part 10 while the vehicle travels can be collected, environmental pollution can be minimized, since the fine dust B can be collected using a suction force proportional to a travel speed of the vehicle, uniform collection performance can be maintained, and since the fine dust collection line 300 can be easily separated, maintenance is easy.

Although specific embodiments related to the dust collector for a vehicle according to the present invention have been described above, it is apparent that the present invention can be variously modified without departing from the scope of the present invention.

Therefore, the scope of the present invention is defined not by the described embodiments but by the appended claims, and encompasses equivalents that fall within the scope of the appended claims.

That is, the above-described embodiments should be considered in a descriptive sense only and not for purposes of limitation. The scope of the present invention is defined not by the detailed description but by the appended claims, and encompasses all modifications and alterations derived from meanings and the scope and equivalents of the appended claims.

Modes of the Invention

Embodiments for implementation of the present invention have been described in "modes of the invention" above.

INDUSTRIAL APPLICABILITY

In the present invention, since fine dust generated by a wheel accommodation part while a vehicle travels can be collected, environmental pollution can be minimized, thereby being industrially useful.

The invention claimed is:
1. A dust collector for a vehicle, comprising:
wheel accommodation parts which are formed on both sides of a vehicle body and in which wheels are located;
a plurality of suction parts which are provided on inner circumferential surfaces of the wheel accommodation parts and through which inlet holes of front surfaces of the suction parts pass in a front-rear direction to communicate with suction spaces;
a collection part which is provided on the vehicle body in which accommodation space is formed to accommodate fine dust and an inlet port and an outlet port are formed to allow air to be introduced and discharged;
a plurality of collection lines which have lengths in the front-rear direction and have front ends connected to the suction parts and of which passages passing through the collection lines in a longitudinal direction communicate with the suction spaces;
a driving part which is connected to a rear end of each of the collection lines and the inlet port and generate a suction force to forcibly move air transmitted through each of the passages to the inlet port;
a controller which is electrically connected to a battery provided in the vehicle body and controls operation of the driving part,
a filter part coupled to the outlet port to filter the air,
an auxiliary suction part which horizontally extends from one side of the suction part in the width direction and extend to be bent downward, and is located between the vehicle body and the suction part, and
a speed sensor which is electrically connected to the controller and detects a movement speed of the vehicle body,
wherein the collection part discharges the air, which is introduced through the inlet port, through the outlet port,
the fine dust included in the air is collected into the accommodation space,
the suction part is located to be spaced apart from the wheel in a radial direction of the wheel and has a curved length in a rotational direction of the wheel; and
the plurality of inlet holes are arranged to be spaced apart from each other in one or more directions of a longitudinal direction and a width direction of the suction part, the controller presets a reference speed and changes a suction force of the driving part such that the suction force is proportional to the movement speed transmitted from the speed sensor, an auxiliary suction space is formed in the auxiliary suction part, an upper side of the auxiliary suction space communicates with one side of the suction space in a width direction so that an air flows, and an auxiliary inlet hole is formed in one side surface of the auxiliary suction part such that the air is suctioned into the auxiliary suction space, and the auxiliary inlet hole is formed in one side surface of the auxiliary suction part facing the wheel and passes through the auxiliary suction part in a left-right direction such that the fine dust generated in the wheel accommodation part moves to the auxiliary suction space.

2. The dust collector of claim 1, further comprising:

a collecting amount sensor which is coupled to the collection part and transmits an alarm signal to the controller when an amount of the fine dust collected into the accommodation space is a predetermined amount or more; and a signal output part which is electrically connected to the controller when installed on the vehicle body and is turned on to emit light to an outside when the alarm signal is transmitted to the controller.

3. The dust collector of claim 1, further comprising a vibration generator which transmits vibration to the suction part, wherein the vibration generator includes a vibration motor which is coupled to one side of the suction part and of which driving is controlled by the controller, and a heavy weight which is eccentrically rotatably coupled to a driving shaft of the vibration motor and generates vibration due to eccentric rotation when the driving shaft rotates.

\* \* \* \* \*